(12) United States Patent
Gibbs et al.

(10) Patent No.: US 9,337,762 B1
(45) Date of Patent: May 10, 2016

(54) SYSTEM AND METHOD FOR MAGNETIZING A TRANSFORMER IN AN ELECTRICAL SYSTEM PRIOR TO ENERGIZING THE ELECTRICAL SYSTEM

(71) Applicant: EATON CORPORATION, Cleveland, OH (US)

(72) Inventors: Irving Albert Gibbs, Mills River, NC (US); Thomas Arthur Farr, Candler, NC (US); Ron Carl Schueneman, Arden, NC (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/570,377

(22) Filed: Dec. 15, 2014

(51) Int. Cl.
*H02P 27/00* (2006.01)
*H02P 13/12* (2006.01)
*H02P 1/16* (2006.01)

(52) U.S. Cl.
CPC . *H02P 13/12* (2013.01); *H02P 1/16* (2013.01)

(58) Field of Classification Search
CPC ........................................................ H02P 6/001
USPC .................................. 318/400.3, 400.01, 700
See application file for complete search history.

(56) References Cited

U.S. PATENT DOCUMENTS

| 7,511,975 | B2 | 3/2009 | Hammond |
| 7,880,343 | B2 | 2/2011 | Kleinecke et al. |
| 7,965,529 | B2 * | 6/2011 | Gibbs ................... H02M 7/062 323/248 |
| 8,223,515 | B2 | 7/2012 | Abolhassani et al. |
| 2008/0258672 | A1 | 10/2008 | Osman et al. |
| 2012/0032512 | A1 | 2/2012 | Aiello et al. |

OTHER PUBLICATIONS

Abdou Barrow, "Assembling and commissioning a WEG MV01 medium voltage VFD", EMA, Inc., http://www.emainc.net/newsletter/assembling-and-commissioning-a-weg-mv01-medium-v . . . , pp. 1-3.
Siemens, "Applications and Advanced Features", NXG Control Manual, Chapter 5, pp. 5-1 through 5-120, A1A19001588: Vrsion 4.0.
Hitachi, Ltd., "HIVECTOL-HVI", Medium Voltage Multi-level IGBT Drives, Jun. 2008, pp. 1-40, Printed in Japan (ICC).
European Patent Office, "International Search Report and Written Opinion", corresponding PCT Appl. No. PCT/US2015/056547, Jan. 29, 2016, 11 pp.

* cited by examiner

*Primary Examiner* — David S Luo
(74) *Attorney, Agent, or Firm* — Eckert Seamans Cherin & Mellott, LLC; Philip E. Levy

(57) ABSTRACT

An electrical system includes a transformer structured to be selectively coupled to an AC source that provides a main AC voltage, the transformer having a number of sets of primary windings and a number of sets of secondary windings, and a charging module structured to generate a magnetizing AC voltage. The charging module is structured to selectively provide the magnetizing AC voltage to: (i) one of the number of sets primary windings, or (ii) one of the number of sets secondary windings. The magnetizing AC voltage is such that responsive to the magnetizing AC voltage being provided to one of the number of sets of primary windings or one of the number of sets of secondary windings, one or more of the number of sets of primary windings will be magnetized in a manner wherein a flux of the one or more of the number of primary windings is in phase with the main AC voltage provided from the AC source.

20 Claims, 2 Drawing Sheets

US 9,337,762 B1

SYSTEM AND METHOD FOR MAGNETIZING A TRANSFORMER IN AN ELECTRICAL SYSTEM PRIOR TO ENERGIZING THE ELECTRICAL SYSTEM

BACKGROUND

1. Field

The disclosed concept pertains generally to electrical systems that employ AC transformers, such as, without limitation, a variable frequency drive employing an isolation transformer or an electrical distribution system employing a distribution transformer, and, more particularly, to a system and method for magnetizing the transformer prior to energizing the electrical system from the main AC source.

2. Background Information

A voltage source inverter is often used to power a motor, such as an induction or synchronous motor, or a generator, with a suitable medium voltage. One example of a voltage source inverter is a variable frequency drive (VFD), which controls the rotational speed of an alternating current (AC) electric motor by controlling the frequency of the electrical power supplied to the motor. VFDs are also known as adjustable frequency drives (AFDs), variable speed drives (VSDs), AC drives, microdrives or inverter drives. Since the voltage is varied along with the frequency, these are sometimes also called VVVF (variable voltage variable frequency) drives.

Typically, a VFD first converts an AC input power to a DC intermediate power. The DC intermediate power is then converted to a quasi-sinusoidal AC power for driving the motor. Thus, the main components of a typical VFD include a number of input isolation transformers coupled to the source of AC power, a converter, such as a number of rectifier bridge assemblies, for converting the AC source power into the DC intermediate power, a direct current (DC) bus and associated DC bus capacitors for storing the DC intermediate power, and an inverter for converting the stored DC intermediate power into a variable voltage, variable frequency AC voltage for driving the motor.

One problem encountered by VFDs is caused by the fact that, when a transformer is first energized, a transient current up to 10 to 15 times larger than the rated transformer current can flow for several cycles. This transient current is known as inrush current. The magnitude of the inrush current may cause fuses to open, breakers or contactors to open, and protection relays to "false trip". For large drives, this problem is significant in that the power system must be sized to provide the transient in-rush currents. Eliminating the inrush is of significant advantage as it increases reliability and/or reduces system cost.

A second problem encountered by Voltage Source Inverters is charging the large capacitors during initial energization to prevent damage to rectifier, fuses and associated circuitry.

The above-described problem of inrush current is not limited to VFDs. Rather, inrush current is a problem for any electrical system that utilizes a (large) transformer, such as, without limitation, an electrical distribution system that employs a distribution transformer or any industrial equipment that employs a drive having an input transformer. There also needs to be a method of pre charging the capacitors.

There is thus a need for a system and method for effectively reducing and/or eliminating inrush current in electrical systems that utilize input transformers.

SUMMARY

In one embodiment, an electrical system is provided that includes a transformer structured to be selectively coupled to an AC source that provides a main AC voltage, the transformer having a number of sets of primary windings and a number of sets of secondary windings, and a charging module structured to generate a magnetizing AC voltage. The charging module is structured to selectively provide the magnetizing AC voltage to: (i) one of the number of sets primary windings, or (ii) one of the number of sets secondary windings. The magnetizing AC voltage is such that responsive to the magnetizing AC voltage being provided to one of the number of sets of primary windings or one of the number of sets of secondary windings, one or more of the number of sets of primary windings will be magnetized in a manner wherein a flux of the one or more of the number of primary windings is in phase with the main AC voltage provided from the AC source.

In one embodiment, a method of energizing an electrical system is provided, wherein the electrical system includes a transformer structured to be selectively coupled to an AC source that provides a main AC voltage, the transformer having a number of sets of primary windings and a number of sets of secondary windings. The method includes generating a magnetizing AC voltage when the number of sets of primary windings is not coupled to the AC source, providing the magnetizing AC voltage to one of the number of sets primary windings or one of the number of sets secondary windings when the number of sets of primary windings is not coupled to the AC source to magnetize one or more of the number of sets of primary windings in a manner wherein a flux of the one or more of the number of primary windings is in phase with the main AC voltage, and coupling the number of sets of primary windings to the AC source such that the main AC voltage is applied to the number of sets of primary windings.

In another embodiment, a variable frequency drive system is provided. The variable frequency drive system includes a variable frequency drive including a transformer structured to be selectively coupled to an AC source that provides a main AC voltage, the transformer having a number of sets of primary windings and a number of sets of secondary windings, a converter coupled to the number of sets of secondary windings, a DC link coupled to an output of the converter, and an inverter coupled to the DC link. The variable frequency drive system also includes a charging module structured to generate a magnetizing AC voltage, wherein the charging module is structured to selectively provide the magnetizing AC voltage to: (i) one of the number of sets primary windings, or (ii) one of the number of sets secondary windings, wherein the magnetizing AC voltage is such that responsive to the magnetizing AC voltage being provided to one of the number of sets of primary windings or one of the number of sets of secondary windings, one or more of the number of sets of primary windings will be magnetized in a manner wherein a flux of the one or more of the number of primary windings is in phase with the main AC voltage provided from the AC source.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
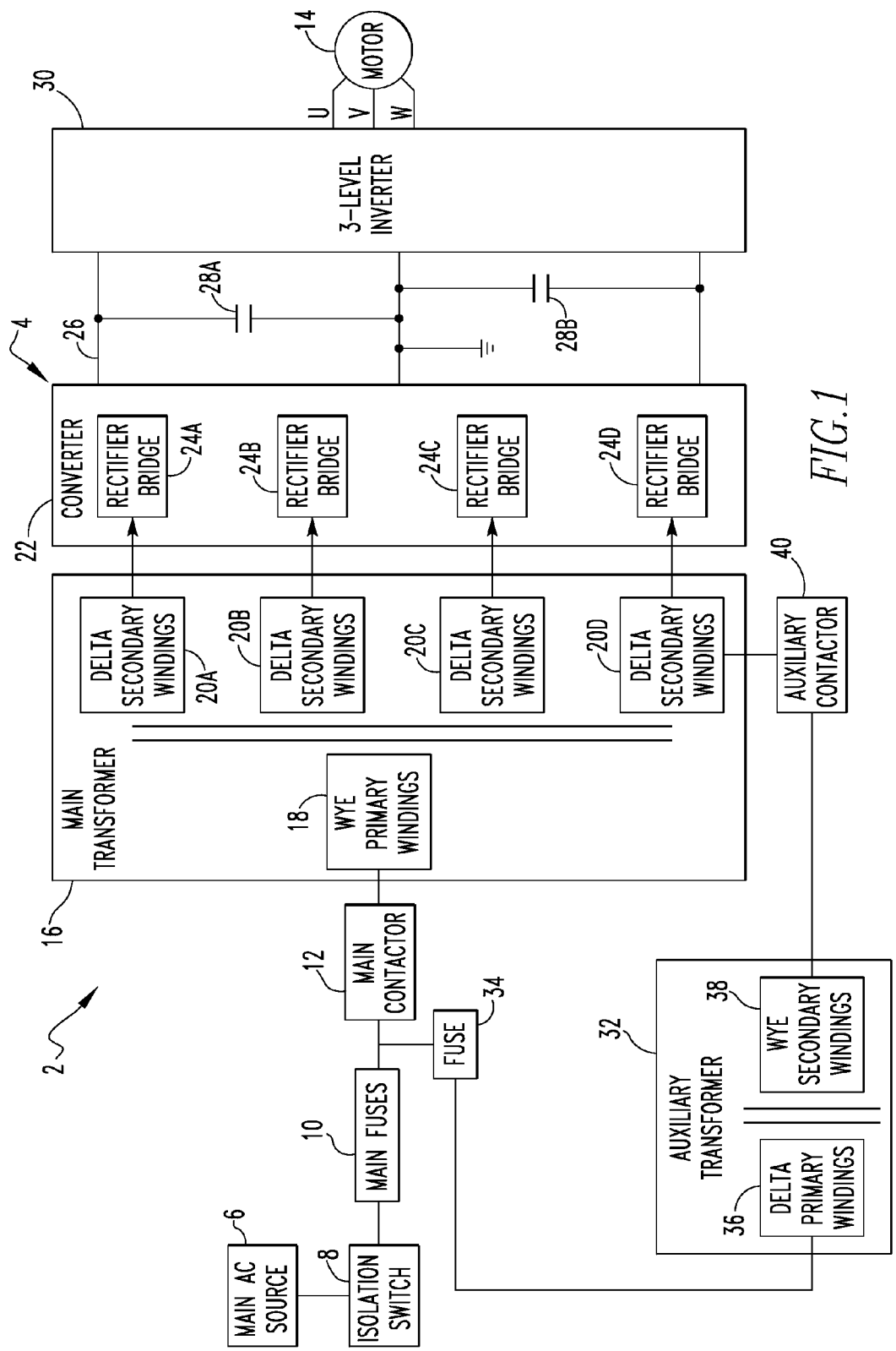
FIG. 1 is a schematic diagram of an electrical system according to one non-limiting exemplary embodiment which implements a method for reducing and/or eliminating inrush current according to the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As used herein, the term "set of windings" shall mean a group of one or more windings such as a group of one or more primary windings or a group of one or more secondary windings.

The disclosed concept provides a system and method for reducing and/or eliminating inrush current in electrical system by charging or magnetizing an input transformer, such as, without limitation, an isolation transformer of a VFD, of the electrical system before the electrical system is energized by a main AC source (e.g., such as the main electrical grid). In particular, and as described in greater detail herein in the various exemplary embodiments, the disclosed concept provides a system and method wherein a transformer is charged or magnetized in advance of the system being fully energized in such a manner that the flux and voltage of the primary winding or windings of the transformer are in phase with the main AC source that is soon to be applied to the transformer.

FIG. 1 is a schematic diagram of an electrical system 2 according to one non-limiting exemplary embodiment which implements the method for reducing and/or eliminating inrush current of the disclosed concept. As seen in FIG. 1, system 2 includes a variable frequency drive 4 that is fed by a main AC source 6, such as the main electrical grid, through an isolation switch 8, main fuses 10, and a main contactor 12. In the non-limiting exemplary embodiment, main AC source 6 is a 4160V, poly-phase (e.g., three-phase) AC input. Also in the non-limiting exemplary embodiment, variable frequency drive 4 is used to drive a poly-phase motor 14.

Variable frequency drive 4 includes a 3-phase, phase shifting main transformer 16. In the non-limiting, exemplary embodiment, main transformer 16 is a wye-delta transformer having a set of wye-connected primary windings 18 and a number of sets of delta-connected secondary windings 20. In the exemplary embodiment, main transformer 16 is a 24-pulse transformer and includes four sets of delta-connected secondary windings 20, labeled 20A, 20B, 20C, and 20D. In the non-limiting, exemplary embodiment, each set of delta-connected secondary windings 20 comprises a set of extended delta windings, and the voltage at delta-connected secondary winding 20A is phase shifted +22.5°, the voltage at delta-connected secondary windings 20B is phase shifted −7.5°, the voltage at delta-connected secondary windings 20C is phase shifted +7.5°, and the voltage at delta-connected secondary windings 20D is phase shifted −22.5°. As seen in FIG. 1, a converter 22 is coupled to delta-connected secondary windings 20A-20D and receives the 3-phase AC output thereof. Converter 22 has four AC to DC rectifier bridges 24, labeled 24A, 24B, 24C and 24D, arranged in series connection creating two twelve pulse rectifiers which result in 24-pulse harmonic mitigation on the primary of main transformer 16. Converter 22 thus converts the 3-phase AC output present on delta-connected secondary windings 20A-20D to DC power.

The output of converter 22 is coupled to a DC link 26 (sometimes also referred to as a DC bus) having capacitors 28A and 28B. The output of DC link 26 is coupled to the input of an inverter 30. In the exemplary embodiment, inverter 30 is a 3-level inverter such as a 3-level NPC inverter, although it will be understood that other suitable inverter topologies may also be used. As is known in the art, inverter 30 converts the DC power on DC link 26 to 3-phase quasi-sinusoidal AC power (see phases U, V, W in FIG. 1) which is provided to poly-phase motor 14.

Electrical system 2 further includes a 3-phase, phase shifting auxiliary transformer 32 which, as described herein, is used to magnetize main transformer 16 of variable frequency drive 4 before variable frequency drive 4 is energized by main AC source 6 in order to reduce and/or eliminate the inrush current into variable frequency drive 4. The phase shifting of auxiliary transformer 32 is chosen so as to match the phase shifting of main transformer 16. Auxiliary transformer 32 is electrically connected between main fuses 10 and main contactor 12 through a fuse 34. Thus, auxiliary transformer 32 is structured to receive, on the primary thereof, the voltage from main AC source 6. In the non-limiting, exemplary embodiment, auxiliary transformer 32 is a delta-wye transformer having a set of delta-connected primary windings 36 and a set of wye-connected secondary windings 38. In the exemplary embodiment, auxiliary transformer 32 is a step down transformer that converts the voltage from main source 6 to a lower voltage. In the non-limiting exemplary embodiment, auxiliary transformer is structured to output approximately 300V AC on the set of wye-connected windings 38 when a 4160V AC voltage is applied to delta-connected primary windings 36. It will be understood, however, that this is meant to be exemplary only and that other transformer ratios may also be employed within the scope of the disclosed concept.

As seen in FIG. 1, wye-connected secondary windings 38 are coupled to a first side of a 3-phase auxiliary contactor 40. In the non-limiting, exemplary embodiment, auxiliary contactor 40 is a low voltage contactor. The second side of auxiliary contactor 40 is coupled to one of the sets of delta-connected secondary windings 20 of main transformer 16. In the exemplary embodiment, the second side of auxiliary contactor 40 is coupled to the set of delta-connected secondary windings 20D, although it will be understood that this is exemplary only and that the connection just described may be made to any of the other sets of delta-connected secondary windings 20, or even to the set of wye-connected primary windings 18.

Figure 2:
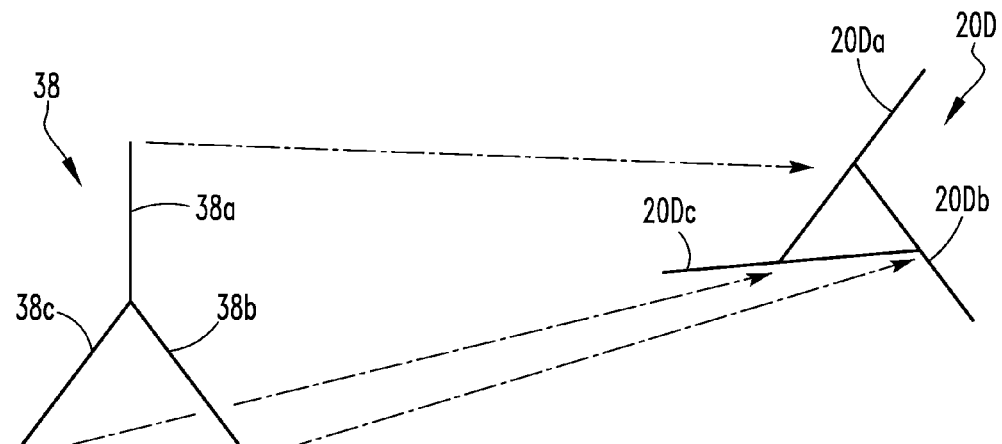
FIG. 2 is a schematic representation illustrating how the windings of the auxiliary transformer may be connected to the windings of the main input transformer of the system of FIG. 1 according to an exemplary embodiment of the disclosed concept.

FIG. 2 is a schematic representation illustrating how the connection of the set of wye-connected secondary windings 38 is connected to the set of delta-connected secondary windings 20D through auxiliary contactor 40 according to an exemplary embodiment. The set of wye-connected secondary windings 38 includes windings 38a, 38b, and 38c, and the delta-connected secondary windings 20D includes extended windings 20Da, 20Db and 20Dc. As seen in FIG. 2, winding 38a is connected at the junction of winding 20Da and 20Db, winding 38b is connected at the junction of winding 20Dc and 20Db, and winding 38C is connected to the junction of winding 20Dc and 20Da.

Again, it will be appreciated that the particular configurations described herein are exemplary only, and that other connection configurations are possible within the scope of the disclosed concept. For example, and without limitation, main transformer 16 may be a transformer other than a wye-delta transformer and auxiliary transformer 32 may be a transformer other than a delta-wye transformer.

In operation, when variable frequency drive 4 is to be "turned on", main contactor 12 is moved to an open position and auxiliary contactor 40 is moved to a closed position. Isolation switch 8 may then be closed, which causes the voltage of main AC source 6 to be applied to the set of delta-connected primary windings 36 of auxiliary transformer 32. This will result in a voltage being induced in the set of wye-connected secondary windings 38 of auxiliary transformer 32. That voltage will be applied to the set of delta-connected secondary windings 20D of main transformer 16 through auxiliary contactor 40 in order to magnetize main transformer 16. Because of the relatively high impedance of auxiliary transformer 32, main transformer 16 will be magnetized softly at less than the rated current. Once main transformer 16 is sufficiently magnetized, main contactor 12 is closed such that the voltage of main AC source 6 will be applied to the already magnetized set of wye-connected primary windings 18 of main contactor 16. After main contactor 12 is closed, then auxiliary contactor 40 is opened. When main contactor 12 is closed, the phase of the set of wye-connected primary windings 18 will match the phase of the voltage of main AC source 6 being applied. Because the wye-connected primary windings 18 have already been magnetized as just described, the inrush current into variable frequency drive 4 will be reduced and/or eliminated. When auxiliary contactor 40 is closed, DC link 26 (the DC bus) is charged.

The determination as to when the main transformer 16 is sufficiently magnetized such that full energizing of variable frequency drive 4 may begin may be made in any of a number of ways, including monitoring the voltage of the DC link 26 and determining that sufficient magnetization has occurred when that voltage reaches a certain threshold level, monitoring the voltage of the set of wye-connected primary windings 18 and determining that sufficient magnetization has occurred when that voltage reaches a certain threshold level, or measuring the current flowing into auxiliary transformer 32 and determining that sufficient magnetization has occurred when that current settles, meaning that it is no longer changing to a significant degree.

Thus, the disclosed concept provides a mechanism and methodology by which a transformer, such as main transformer 16, may be magnetized in advance of being fully energized in a manner that eliminates and/or reduces the inrush current into the transformer. A secondary benefit of the mechanism and methodology of the disclosed concept is that DC link 26 will also be charged, thus eliminating the need for a pre-charge circuit. Furthermore, by adding additional windings to auxiliary transformer 32, it may be used for other purposes, such as providing power for a cooling fan for variable frequency drive 4. Still other potential benefits include reduced arc flash incident energy levels because protection relays can be set with lower instantaneous current trip settings. This feature provides quicker fault clearing time and lower arc flash ratings for the equipment and personnel protective equipment.

Figure 3:
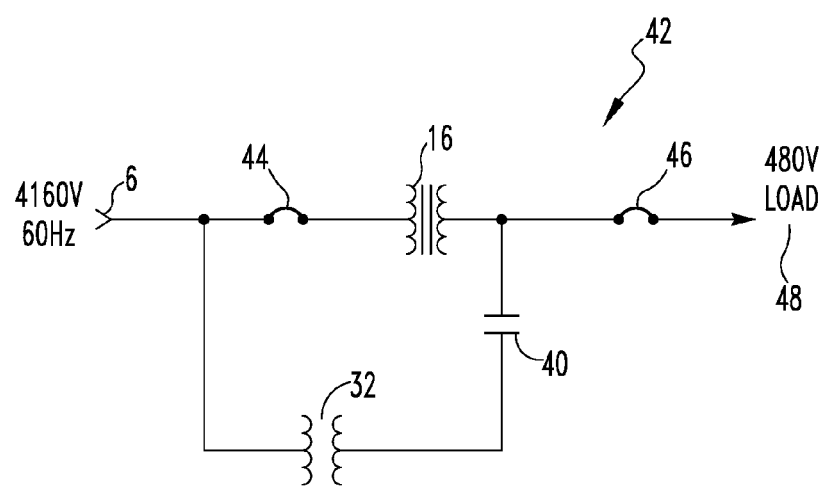
FIG. 3 is a schematic diagram of an electrical distribution system 42 according to an alternative exemplary embodiment.

FIG. 3 is a schematic diagram of an electrical distribution system 42 according to an alternative exemplary embodiment. Electrical distribution system 42 is similar to electrical system 2 described elsewhere herein, and like components are labeled with like reference numerals. However, while electrical system 2 employs the disclosed concept in connection with magnetizing an isolation transformer feeding a variable frequency drive, electrical distribution system 42 employs the disclosed concept in connection with magnetizing a main distribution transformer of electrical distribution system 42 for feeding a number of loads. In particular, as seen in FIG. 3, electrical distribution system 42 includes main AC source 6 as described herein, which, in the exemplary embodiment, is a 4160V, 60 Hz utility source, main transformer 16 as described herein, auxiliary transformer 32 as described herein, and auxiliary contactor 40 as described herein. Electrical distribution system 42 further includes a line breaker 44, which may be a contactor, a fused switch or a circuit breaker, a secondary breaker 46, and a load 48. Line breaker 44 is provided between the main AC source 6 and main transformer 16, and secondary breaker 46 is provided between main transformer 16 and load 48. In operation, in order to provide power to load 48, line breaker 44 and secondary breaker 46 are in an open condition. Auxiliary transformer 32 is then powered from main AC source 6. Auxiliary contactor 40 then connects the secondary of auxiliary transformer 32 to the secondary of main transformer 16. Line breaker 44 then closes with no inrush current. Next, auxiliary contactor 40 is opened and secondary breaker 46 is closed.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical system, comprising:
   a transformer structured to be selectively coupled to an AC source that provides a main AC voltage, the transformer having a number of sets of primary windings and a number of sets of secondary windings; and
   a charging module structured to generate a magnetizing AC voltage, wherein the charging module is structured to selectively provide the magnetizing AC voltage to: (i) one of the number of sets primary windings, or (ii) one of the number of sets secondary windings, wherein the magnetizing AC voltage is such that responsive to the magnetizing AC voltage being provided to one of the number of sets of primary windings or one of the number of sets of secondary windings, one or more of the number of sets of primary windings will be magnetized in a manner wherein a flux of the one or more of the number of primary windings is in phase with the main AC voltage provided from the AC source.

2. The electrical system according to claim 1, wherein the charging module is structured to be selectively coupled to the AC source and generate the magnetizing AC voltage in response to receiving the main AC voltage.

3. The electrical system according to claim 2, wherein the charging module comprises an auxiliary transformer having a number of sets of auxiliary primary windings and a number of sets of auxiliary secondary windings, wherein one of the number of sets of auxiliary secondary windings is structured to be selectively coupled to one of the number of sets of primary windings or one of the number of sets of secondary windings.

4. The electrical system according to claim 3, wherein the one of the number of sets of auxiliary secondary windings is structured to be selectively coupled to one of the number of sets of primary windings or one of the number of sets of secondary windings through an auxiliary contactor.

5. The electrical system according to claim 4, wherein the one of the number of sets of auxiliary secondary windings is structured to be selectively coupled to one of the number of sets of secondary windings through the auxiliary contactor.

6. The electrical system according to claim 5, wherein the transformer is a 3-phase phase shifting wye-delta transformer and the auxiliary transformer is a 3-phase phase shifting delta-wye transformer, wherein the one of the number of sets of auxiliary secondary windings comprises a set of wye-connected auxiliary windings and wherein the one of the number of sets of secondary windings comprises a set of delta-connected windings.

7. The electrical system according to claim 1, wherein the transformer is structured to be selectively coupled to the AC source through a main contactor.

8. The electrical system according to claim 1, wherein the transformer is an isolation transformer of a variable frequency drive.

9. A method of energizing an electrical system, the electrical system including a transformer structured to be selectively coupled to an AC source that provides a main AC voltage, the transformer having a number of sets of primary windings and a number of sets of secondary windings, the method comprising:
generating a magnetizing AC voltage when the number of sets of primary windings is not coupled to the AC source;
providing the magnetizing AC voltage to one of the number of sets primary windings or one of the number of sets secondary windings when the number of sets of primary windings is not coupled to the AC source to magnetize one or more of the number of sets of primary windings in a manner wherein a flux of the one or more of the number of primary windings is in phase with the main AC voltage; and
coupling the number of sets of primary windings to the AC source such that the main AC voltage is applied to the number of sets of primary windings.

10. The method according to claim 9, further comprising terminating the providing the magnetizing AC voltage before or after coupling the number of sets of primary windings to the AC source.

11. The method according to claim 9, wherein the generating the magnetizing AC voltage comprises providing the main voltage to a set of primary windings of an auxiliary transformer, and wherein the providing the magnetizing AC voltage comprises coupling a set of secondary windings of the auxiliary transformer to one of the number of sets primary windings or one of the number of sets secondary windings when the number of sets of primary windings is not coupled to the AC source.

12. The method according to claim 11, wherein the transformer is a wye-delta transformer and the auxiliary transformer is a delta-wye transformer, wherein the set of secondary windings of the auxiliary transformer comprises a set of wye-connected windings, wherein the one of the number of sets of secondary windings comprises a set of delta-connected windings, and wherein the providing the magnetizing AC voltage comprises coupling the wye-connected windings to the delta-connected windings.

13. The method according to claim 9, wherein the transformer is an isolation transformer of a variable frequency drive.

14. A variable frequency drive system, comprising:
a variable frequency drive including:
a transformer structured to be selectively coupled to an AC source that provides a main AC voltage, the transformer having a number of sets of primary windings and a number of sets of secondary windings;
a converter coupled to the number of sets of secondary windings;
a DC link coupled to an output of the converter; and
an inverter coupled to the DC link; and
a charging module structured to generate a magnetizing AC voltage, wherein the charging module is structured to selectively provide the magnetizing AC voltage to: (i) one of the number of sets primary windings, or (ii) one of the number of sets secondary windings, wherein the magnetizing AC voltage is such that responsive to the magnetizing AC voltage being provided to one of the number of sets of primary windings or one of the number of sets of secondary windings, one or more of the number of sets of primary windings will be magnetized in a manner wherein a flux of the one or more of the number of primary windings is in phase with the main AC voltage provided from the AC source.

15. The variable frequency drive system according to claim 14, wherein the charging module is structured to be selectively coupled to the AC source and generate the magnetizing AC voltage in response to receiving the main AC voltage.

16. The variable frequency drive system according to claim 15, wherein the charging module comprises an auxiliary transformer having a number of sets of auxiliary primary windings and a number of sets of auxiliary secondary windings, wherein one of the number of sets of auxiliary secondary windings is structured to be selectively coupled to one of the number of sets of primary windings or one of the number of sets of secondary windings.

17. The variable frequency drive system according to claim 16, wherein the one of the number of sets of auxiliary secondary windings is structured to be selectively coupled to one of the number of sets of primary windings or one of the number of sets of secondary windings through an auxiliary contactor.

18. The variable frequency drive system according to claim 17, wherein the one of the number of sets of auxiliary secondary windings is structured to be selectively coupled to one of the number of sets of secondary windings through the auxiliary contactor.

19. The variable frequency drive system according to claim 18, wherein the transformer is a 3-phase phase shifting wye-delta transformer and the auxiliary transformer is a 3-phase phase shifting delta-wye transformer, wherein the one of the number of sets of auxiliary secondary windings comprises a set of wye-connected auxiliary windings and wherein the one of the number of sets of secondary windings comprises a set of delta-connected windings.

20. The variable frequency drive system according to claim 14, wherein the transformer is structured to be selectively coupled to the AC source through a main contactor.

* * * * *